United States Patent [19]

Oertli

[11] 4,153,995
[45] May 15, 1979

[54] NAVIGATION PLOTTER

[76] Inventor: Donald E. Oertli, Rte. 2, Box 2146, Hamilton, Mont. 59840

[21] Appl. No.: 859,801

[22] Filed: Dec. 12, 1977

[51] Int. Cl.² ............................................. G01C 21/20
[52] U.S. Cl. .................................. 33/75 R; 33/1 SD; 33/76 V
[58] Field of Search ........... 33/1 SD, 1 B, 1 N, 75 R, 33/76 R, 76 VA, 108

[56] References Cited

U.S. PATENT DOCUMENTS

| | | | |
|---|---|---|---|
| 932,907 | 8/1909 | Rydman | 33/75 R |
| 1,594,602 | 8/1926 | Charlton | 33/75 R |
| 2,345,020 | 3/1944 | Warner | 33/75 R |
| 3,280,464 | 10/1966 | Warner | 33/75 R |
| 3,303,568 | 2/1967 | Geiger | 33/75 R |
| 3,535,783 | 10/1970 | Sena | 33/1 SD |
| 3,673,690 | 7/1972 | De Barros | 33/108 |
| 3,813,783 | 6/1974 | Price | 33/1 SD |
| 3,855,706 | 12/1974 | Price | 33/1 SD |

FOREIGN PATENT DOCUMENTS

22833 of 1895 United Kingdom.

*Primary Examiner*—Richard E. Aegerter
*Assistant Examiner*—John W. Shepperd
*Attorney, Agent, or Firm*—Wells, St. John & Roberts

[57] ABSTRACT

A navigation plotter for use with a map or chart having depicted thereon a line depicting a desired course and a compass rose. The plotter comprises a protractor designating angular graduations about a center axis. A linear scale member is mounted upon the protractor for rotation about the central axis. A grid on the linear scale member includes a plurality of sets of parallel lines. The respective sets of lines intersect one another repetitively and serve as visual guides to assist in aligning the linear scale member by arranging one set of lines parallel to the desired course while the protractor is held in registration with the compass rose. A series of radial lines on the linear scale member project from the central axis and are respectively parallel to the individual sets of lines in the grid. The radial lines register visually with the protractor to indicate the compass bearing corresponding to the selected course on the map.

5 Claims, 3 Drawing Figures

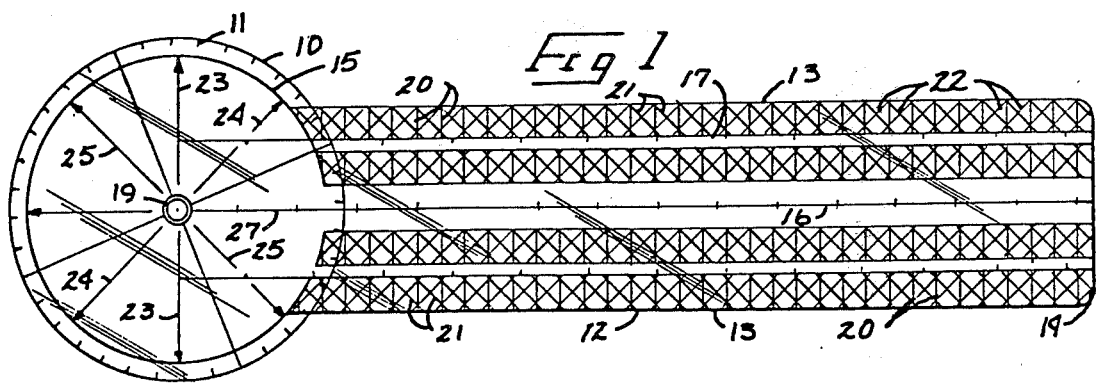
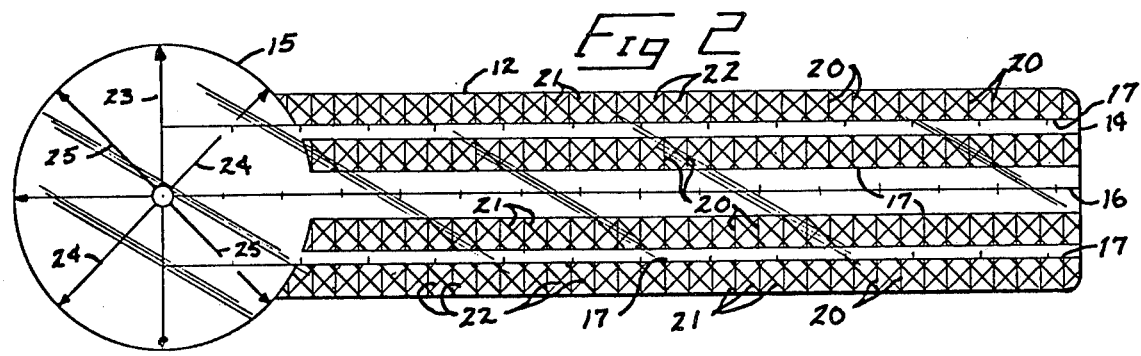
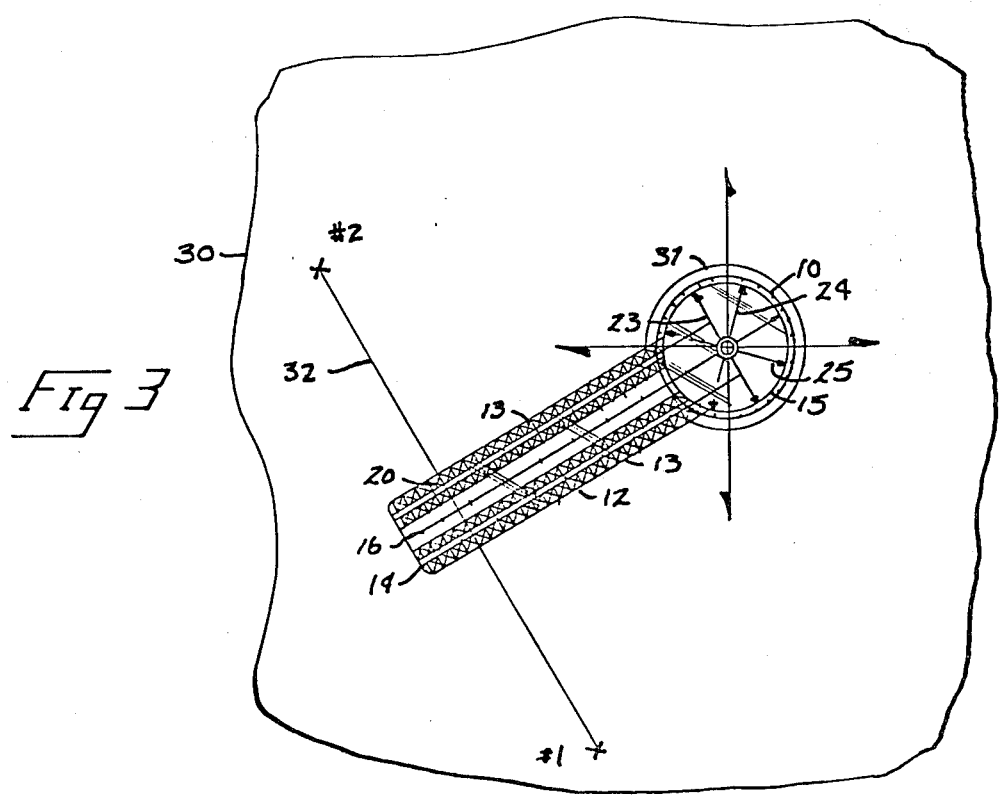

NAVIGATION PLOTTER

BACKGROUND OF THE INVENTION

This disclosure relates to a device for assisting the user of a map in determining the proper compass bearing along a course selected between two points on the map.

Navigational plotters as used with charts and maps for air or sea navigation typically comprise a circular protractor and a pivoted linear scale. When the protractor is placed over a compass rose, the bearing to or from the center of the compass rose can be read directly along the center axis of the linear scale. However, determining a bearing along a course not intersecting a compass rose on the map requires additional manipulation and calculation of angular deviations. This presents substantial opportunities for human error.

A common device for determining the bearing along a course line plotted on a chart or map is a parallel ruler. This device is moved along the map in a progression until one edge is aligned with the compass rose on the chart or map and the bearing can then be read from the compass rose. This is time-consuming and is an indirect method.

An example of a conventional type of protractor-ruler combination used for navigational purposes is illustrated in U.S. Pat. No. 932,907, granted to Rydman in 1909. It comprises a circular protractor and elongated scale which can be used singly or in combination to determine compass headings and distances on a map. It is normally aligned with lines on the map or chart indicative of true north, and requires a secondary corrective disk for compass readings corrected for magnetic deviation. The manipulation of two protractor disks introduces a significant chance of error and confused confusion navigation calculations. More recent patents having similar structures and presenting similar problems are those granted to Price; U.S. Pat. Nos. 3,813,783 and 3,855,706.

Another instrument for assisting in determining a true course heading is illustrated by the Sena U.S. Pat. No. 3,535,783. However, it is used in relation to reference lines on the map, and can directly read magnetic compass bearings only with respect to courses intersecting a map compass rose. A similar limitation arises when using the adjustable plotter shown in U.S. Pat. No. 3,280,464 to Warner, granted in 1966.

In contrast to these prior protractor-ruler combinations, the present device is capable of conventional use for determining distances and bearings, but further enables the user to directly read magnetic bearings corresponding to any straight line course on a map within the vicinity of a map compass rose. Such compass roses occur with regularity on navigational maps. In those distributed for air navigational use, a compass rose is imprinted about navigational radio signal station locations. The device disclosed herein permits the navigator to directly read the necessary magnetic compass bearing from one point on the map to another without any mental calculations or directions and without moving any elements across the map or chart.

It is an object of this invention to provide a physically simple device for permitting direct reading of a compass bearing along any selected course adjacent to a compass rose imprinted on a map or chart.

Another object of this invention is to provide a device which eliminates the need for calculations or corrections in determining magnetic bearings and which visually indicates the correct direction of travel by arrows corresponding to the direction of travel.

These and further objects will be evident from the following disclosure and the accompanying drawings.

DESCRIPTION OF THE DRAWINGS

FIG. 1 is a plan view of the navigation plotter;

FIG. 2 is a plan view of the linear scale member alone;

FIG. 3 is a schematic view illustrating use of the navigation plotter on a chart.

DESCRIPTION OF THE PREFERRED EMBODIMENT

FIG. 1 shows the complete device. It is preferably constructed from planar sheet material, such as a transparent plastic. It includes a protractor 10 having an imprinted 360° scale 11 encircling a center axis defined by a grommet 19. The protractor 10 is a circular disk, and is conventional in navigation plotters. The progressive graduations indicated about the scale 11 correspond to the visual readings taken on magnetic or radio compasses for navigation purposes. The size of protractor 10 typically corresponds to the imprinted size of the compass rose on a map or chart with which it is to be used.

The second element of the device is a linear scale member 12, which is rotatably joined to the protractor 10 by grommet 19 for relative angular movement between protractor 10 and member 12. In the preferred arrangement, the protractor 10 is the upper member and the linear scale member 12 is the lower member which is placed adjacent to a map or chart surface. However, since both elements of the device are formed from transparent material, this physical arrangement can be reversed if desired.

The linear scale member 12 presents an integral arm extending beyond one side of the protractor 10 having a rectangular configuration defined by elongated side edges 13 and an outer edge 14 perpendicular to the edges 13. This rectangular configuration of the extended arm protrudes outward from a circular configuration defined by a peripheral arcuate edge 15. The physical details of the linear scale member 12 are best illustrated in FIG. 2.

The linear scale member 12 includes a central longitudinal line 16 inscribed thereon and parallel longitudinal lines 17 arranged to the sides of it. These longitudinal lines 16 and 17 may have imprinted numerical scales enabling the user to visually determine linear distances along a map or chart. Such linear scales are conventional in this type of navigation device and do not relate directly to the improvement which is the subject of this disclosure.

As can be seen in FIGS. 1 and 2, a grid pattern is repeated along the length of the rectangular configuration of member 12 outward from that portion of it on which the protractor 10 is superimposed. This grid comprises a first set of lines 20, illustrated as being perpendicular to the longitudinal lines 16, 17. It further comprises a second set of lines 21, angular displaced 45° from the first set of lines 20. A third set of lines 22 is perpendicular to the second set 21 and is angularly displaced 45° from the first set 20. The three sets of lines 20, 21 and 22 intersect one another in a repetitive pattern along the length of the member 12. The three sets intersect one another at common points. Each set of lines is comprised of equally spaced parallel lines.

The portion of member 12 having a circular configuration has imprinted thereon a series of radial lines corresponding respectively to the three sets of lines 20, 21 and 22. These include lines 23, parallel to the first set of lines 20; lines 24, parallel to the second set of lines 21; and lines 25, parallel to the third set of lines 22. Each line 23, 24 and 25 has an arrow thereon directed outward from the central axis of the assembly. In addition to these radial lines, the usual radial extension of the central longitudinal line 16 is indicated under protractor 10 by the reference numeral 27.

The use of the navigation plotter is illustrated in FIG. 3. The illustrative map 30 is shown with a conventional compass rose 31 imprinted on the map in the general manner used to encircle VOR stations on aeronautical charts. The compass rose 31 conventionally surrounds the location of the VOR station and is aligned with magnetic north.

To determine the bearing between two locations along a course 32 that does not interest the center of the compass rose 31, the user first places the center of the protractor 10 upon the center of the compass rose 31 and rotates protractor 10 so that the angular graduations imprinted on it coincide with those of the compass rose 31. In other words, the protractor 10 is aligned with magnetic north at the compass rose location. While protractor 10 is held in this orientation, which is facilitated by the fact that the radius of protractor 10 is greater than the radius of the circular configuration on member 12, the linear scale member 12 is pivoted about the center axis of protractor 10 until it overlaps course 32. It is immaterial what portion of the course 32 is overlapped by the member 12. What is important is that while maintaining the position of protractor 10 and the pivotal center of member 12 one of the sets of lines 20, 21 or 22 is brought into a parallel relationship to the selected course 32.

As in FIG. 3 as an illustration, the first set of lines 20 is parallel to course 32. If the selected path is from point #1 to point #2, or from right to left, the left hand radial line 23 can then be read in conjunction with the scale 11 on protractor 10 to provide a direct indication of the required compass bearing. Referring to the illustrated example, the desired compass bearing would be 330°. This direct reading requires no corrections for magnetic deviation, as would be necessary were the device aligned along the usual map grid aligned in relation to true north. Taking a different course, the linear scale member 12 might be turned until one line in the second or third sets of lines 21 or 22 is parallel to the course, in which case the radial lines 24 or 25 would provide a direct reading of the magnetic bearing desired.

This plotter is therefore readily available to provide a direct method for determining course magnetic headings from navigation charts having compass roses or other magnetic references. It can be used to readily determine magnetic headings from chart grid lines. It is helpful as a landing pattern aid for direct readings of bearings to or from a known location. The several sets of parallel lines in the grid presented along linear scale member 12 are also useful in parallel plotting of lines or courses on a map or chart.

Having described my invention, I claim:
1. A navigation plotter comprising:
a transparent protractor, having a central axis;
a linear scale member;
means rotatably joining the linear scale member to the protractor for selective relative angular movement about said central axis;
said linear scale member having a grid inscribed thereon outward of the protractor, said grid comprising a plurality of sets of parallel lines, the respective sets of parallel lines intersecting one another in a repetitive pattern along the length of the linear scale member;
said linear scale member further having a plurality of radial lines inscribed thereon and centered about said central axis for registration with the protractor, said radial lines being respectively parallel to the individual sets of parallel lines in said grid.

2. A navigational plotter as set out in claim 1 wherein the protractor comprises a circular disk:
said linear scale member having an elongated rectangular configuration extending integrally outward from a coplanar circular configuration concentric with the disk;
the radius of said circular configuration being less than the radius of said disk.

3. A navigational plotter as set out in claim 2 wherein the sets of parallel lines in the grid comprise:
a first set of lines perpendicular to the elongated rectangular dimension of the linear scale member;
a second set of lines intersecting the first set at an angle of 45 degrees;
and a third set of lines perpendicular to the second set of lines;
said first, second and third sets of lines being comprised of equally spaced parallel lines having common points of intersection between the lines of the respective sets.

4. A navigational plotter as set out in claim 1 wherein each radial line on the linear scale member has an arrow thereon directed outward from said central axis.

5. A navigation plotter for use in conjunction with a map including a compass rose, comprising:
first plate means comprising a planar transparent member having a 360° scale about a central axis for registration with the compass rose of a map;
second plate means comprising a planar transparent member;
means rotatably mounting said second plate means to said first plate means for relative angular movement about said second axis;
said second plate means having an integral arm extending beyond one side of said first plate means;
said elongated arm having grid means along its length outward of said first plate means, sad grid means comprising a plurality of sets of parallel lines which sets angularly intersect one another along the length of the elongated arm for facilitating placement of one line in said grid means proximately and parallel to a selected course on a map;
said second plate means having a plurality of radial lines centered about said central axis, each radial line being parallel to one of said sets of parallel lines in said grid means, said radial lines being registrable with the scale on said first plate means;
whereby the bearing of a selected course on a map is designated on said first plate means by one radial line on said second plate means when the scale is in registry with a compass rose adjacent to the selected course and the elongated arm has been moved angularly about said central axis to arrange a line in said grid means in a set parallel to said radial line into a parallel position adjacent or overlying the selected course.

* * * * *